(12) United States Patent
Hoekstra et al.

(10) Patent No.: US 7,140,687 B2
(45) Date of Patent: Nov. 28, 2006

(54) SPRING-LOADED HEADREST

(75) Inventors: Craig Hoekstra, Clinton Township, MI (US); David L. Robinson, Sterling Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 78 days.

(21) Appl. No.: 10/992,599

(22) Filed: Nov. 18, 2004

(65) Prior Publication Data

US 2006/0103216 A1    May 18, 2006

(51) Int. Cl.
*A47C 7/36* (2006.01)
*B60N 2/48* (2006.01)
(52) U.S. Cl. .................. 297/410; 297/404; 297/61; 297/378.12
(58) Field of Classification Search ............ 297/410, 297/61, 378.12, 404, 216.12; 74/422, 421 A
See application file for complete search history.

(56) References Cited

U.S. PATENT DOCUMENTS

| | | | |
|---|---|---|---|
| 3,655,241 A | 4/1972 | Herzer et al. | |
| 3,948,562 A | 4/1976 | Grabner et al. | |
| 4,191,422 A | 3/1980 | Inasawa et al. | |
| 4,191,423 A | 3/1980 | Goldner | |
| 4,193,631 A | 3/1980 | Hobley et al. | |
| 4,351,563 A | 9/1982 | Hattori | |
| 4,674,797 A | 6/1987 | Tateyama | |
| 4,765,683 A | 8/1988 | Hattori | |
| 4,798,415 A | 1/1989 | Tanino et al. | |
| 4,830,434 A * | 5/1989 | Ishida et al. ............... | 297/408 |
| 4,840,428 A | 6/1989 | Kobayashi et al. | |
| 4,844,544 A | 7/1989 | Ochiai | |
| 4,861,107 A | 8/1989 | Vidwans et al. | |
| 5,026,120 A | 6/1991 | Takeda et al. | |
| 5,181,763 A | 1/1993 | Dellanno et al. | |
| 5,199,765 A | 4/1993 | Garmendia et al. | |
| 5,228,749 A | 7/1993 | Harrell | |
| 5,236,245 A | 8/1993 | Harrell | |
| 5,236,246 A | 8/1993 | Harrell | |
| 5,238,295 A | 8/1993 | Harrell | |
| 5,290,091 A | 3/1994 | Dellanno et al. | |
| 5,378,043 A | 1/1995 | Viano et al. | |
| 5,590,933 A | 1/1997 | Andersson | |
| 5,642,918 A | 7/1997 | Sakamoto et al. | |
| 5,660,441 A | 8/1997 | Nagayasu et al. | |
| 5,667,275 A | 9/1997 | Takeda | |
| 5,669,667 A | 9/1997 | Schmidt | |
| 5,681,079 A * | 10/1997 | Robinson .................... | 297/61 |
| 5,683,141 A | 11/1997 | Wakamatsu et al. | |

(Continued)

*Primary Examiner*—Peter M. Cuomo
*Assistant Examiner*—Tania Abraham
(74) *Attorney, Agent, or Firm*—Harness, Dickey & Pierce, P.L.C.

(57) ABSTRACT

A headrest assembly that includes a head support connected to a rail that is adjustably mounted to a housing so that the headrest assembly is capable of moving between a use position and a stow position. A lock member engages the rail in the use position and operably disengages the rail to initiate the movement from the use position to the stow position. Specifically, the rail is biased to a stow position so that disengaging the lock member from the rail moves the headrest assembly from the use position to the stow position. The headrest assembly is also coordinated into a seat assembly such that the movement of a seatback from a use position to a stow position concurrently causes the headrest assembly to move from the use position to the stow position.

21 Claims, 9 Drawing Sheets

U.S. PATENT DOCUMENTS

| | | |
|---|---|---|
| 5,700,057 A | 12/1997 | De Filippo |
| 5,738,412 A | 4/1998 | Aufrere et al. |
| 5,765,918 A | 6/1998 | Wakamatsu et al. |
| 5,820,211 A | 10/1998 | Heilig et al. |
| 5,842,738 A | 12/1998 | Knoll et al. |
| 5,895,094 A * | 4/1999 | Mori et al. ................. 297/410 |
| 5,918,940 A * | 7/1999 | Wakamatsu et al. ........ 297/410 |
| 5,934,750 A | 8/1999 | Fohl |
| 5,938,279 A | 8/1999 | Schubring et al. |
| 5,975,637 A * | 11/1999 | Geuss et al. ................ 297/391 |
| 6,000,760 A | 12/1999 | Chung |
| 6,022,078 A | 2/2000 | Chang |
| 6,024,405 A | 2/2000 | MacAndrew et al. |
| 6,045,181 A | 4/2000 | Ikeda et al. |
| 6,074,010 A | 6/2000 | Takeda |
| 6,074,011 A | 6/2000 | Ptak et al. |
| 6,135,561 A | 10/2000 | Kruger et al. |
| 6,290,298 B1 | 9/2001 | Lee |
| 6,302,485 B1 | 10/2001 | Nakane et al. |
| 6,390,558 B1 | 5/2002 | Fischer et al. |
| 6,419,322 B1 | 7/2002 | Nakane et al. |
| 6,499,805 B1 | 12/2002 | Watadani |
| 6,511,130 B1 | 1/2003 | Dinkel et al. |
| 6,607,242 B1 * | 8/2003 | Estrada et al. ......... 297/216.12 |
| 6,612,653 B1 | 9/2003 | Takata |
| 6,702,385 B1 | 3/2004 | Holdampf et al. |
| 2001/0040396 A1 | 11/2001 | Kreuels et al. |
| 2002/0043858 A1 | 4/2002 | Svantesson et al. |
| 2002/0079723 A1 | 6/2002 | Risch et al. |
| 2002/0084686 A1 | 7/2002 | Takata |
| 2002/0093231 A1 | 7/2002 | Estrada et al. |
| 2004/0036340 A1 | 2/2004 | Imayou et al. |
| 2004/0108766 A1 | 6/2004 | Baker et al. |
| 2004/0113479 A1 | 6/2004 | Jost |
| 2004/0195872 A1 | 10/2004 | Svantesson |
| 2004/0195894 A1 | 10/2004 | Pal et al. |
| 2004/0239160 A1 | 12/2004 | Thunnissen et al. |

* cited by examiner

SPRING-LOADED HEADREST

FIELD OF THE INVENTION

The present invention relates to seat assemblies, and more particularly, to an improved headrest assembly for use with a seat assembly.

BACKGROUND OF THE INVENTION

In vehicle design, particularly for sport utility vehicles or vans, it is common to equip the vehicle with second or third row seats that can be moved from a use position to a stow position in order to provide increased storage capacity. In such seat assemblies, the fold-down seatback is pivotally mounted at its lower end to the seat bottom for rotation between the use position, which may be an upright position, and the stow position, which typically involves the seatback folding to a position approximately parallel to the seat bottom. The movement of the seat assembly to the stow position effectively creates more storage space and also makes it easier to access other areas of the vehicle such as the rear storage or trunk area.

In addition to the increased popularity of second or third row seats that can be more easily stowed, it is becoming increasingly popular to equip such seats with headrests. Although a headrest improves occupant comfort, it is often inconvenient when moving the seat assembly to a stow position. The seat operator is required to first return the headrest to a stow position, i.e., placing the bottom of the headrest in approximate contact with the top of the seatback, before folding the seatback to its stow position. If the seat operator fails to move the headrest to the stow position, the headrest may be out of position and impede movement of the seatback to the stow position. Further, an unstowed headrest may occupy additional vehicle space, in turn reducing vehicle storage capacity. Consequently, requiring operator diligence to move the headrest separately from the seatback each time the operator moves the seat from its use to its stow position is inconvenient, and operator failure to move the headrest may impact storage capacity and impede seatback storage.

SUMMARY OF THE INVENTION

Accordingly, a headrest assembly is provided that includes a head support connected to a rail that is adjustably mounted to a housing so that the headrest assembly is capable of moving between a use position and a stow position. A lock member engages the rail in the use position and operably disengages the rail to initiate movement from the use position to the stow position. Specifically, the rail is biased to a stow position so that disengaging the lock member from the rail causes the headrest assembly to move from the use position to the stow position. The engagement of the lock member to the rail may be controlled in a variety of ways, including by either an automated or a manual actuator. Either actuator is associated with the rail and capable of operably adjusting the rail between the use position and the stow position.

The headrest assembly is coordinated into a seat assembly that also includes a seatback rotatably supported by a seat bottom. The movement of the headrest assembly is coupled with the movement of the seatback so that as the seatback is moved from a use position to a stow position, the headrest assembly moves from a use position to a stow position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description is merely exemplary in nature and is in no way intended to limit the invention, its application, or uses.

With reference to the drawings, a headrest assembly 10 generally includes a housing 12, a head support 14, a rail assembly 16, an automated actuator 18, and a lock member 20. The rail assembly 16 is adjustably mounted to the housing 12 to allow the headrest assembly 10 to move between a use position and a stow position. The lock member 20 selectively engages and disengages one of the rails 56 of rail assembly 16 in order to allow the headrest assembly 10 to move between positions.

Figure 1:
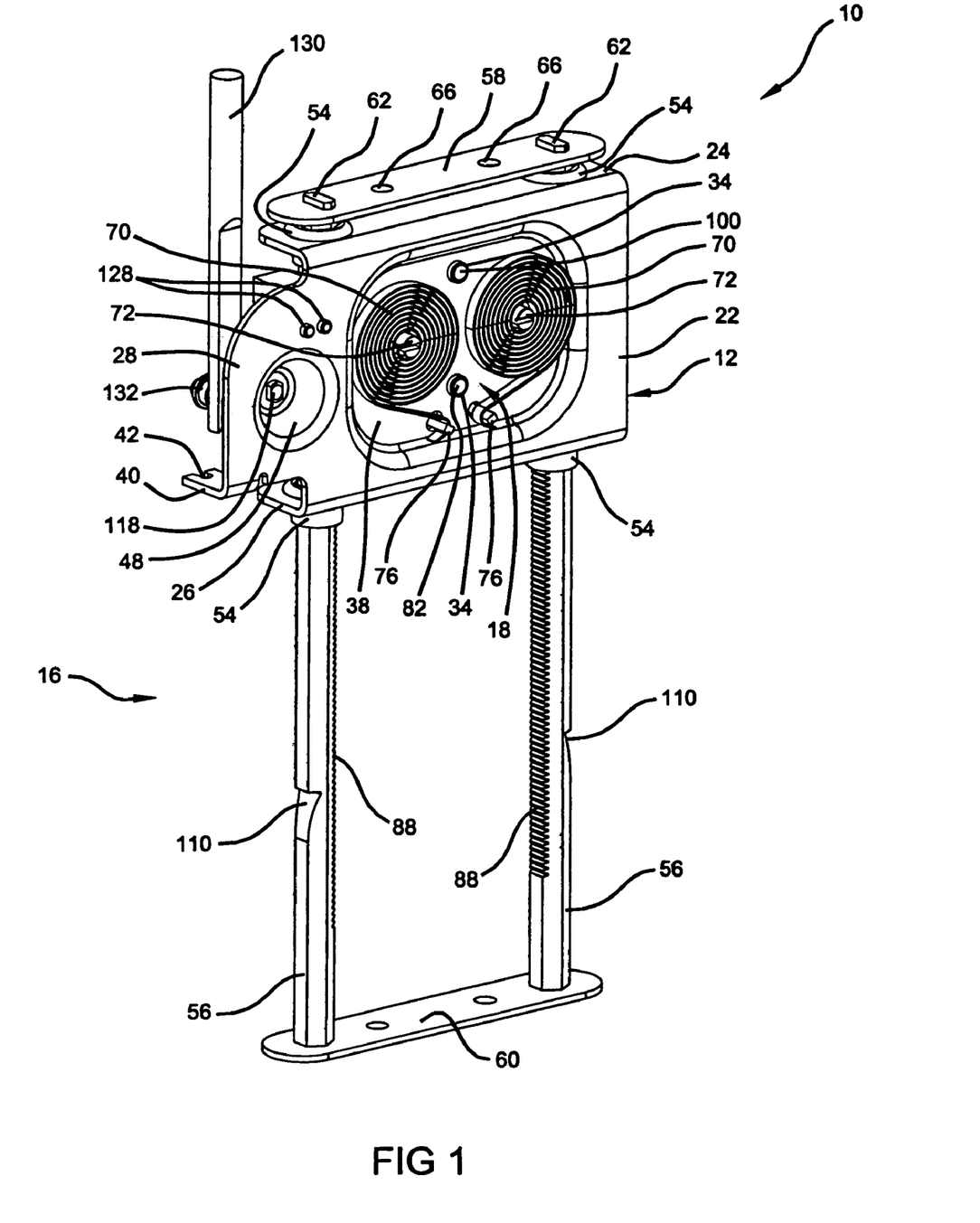
FIG. 1 is a front perspective view of a headrest assembly in accordance with the principles of the present invention.
Figure 2:
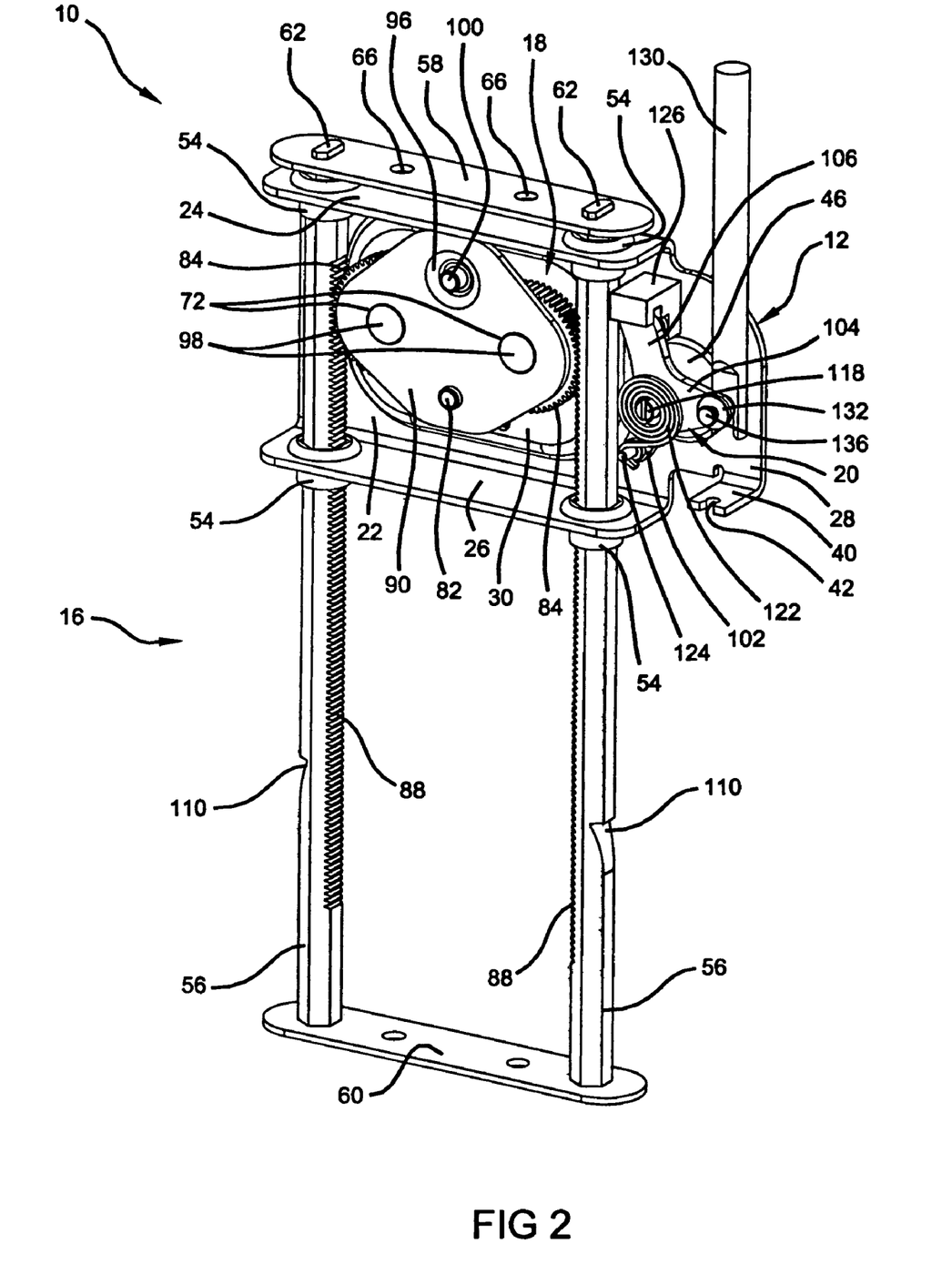
FIG. 2 is a rear perspective view of the headrest assembly of FIG. 1.
Figure 3:
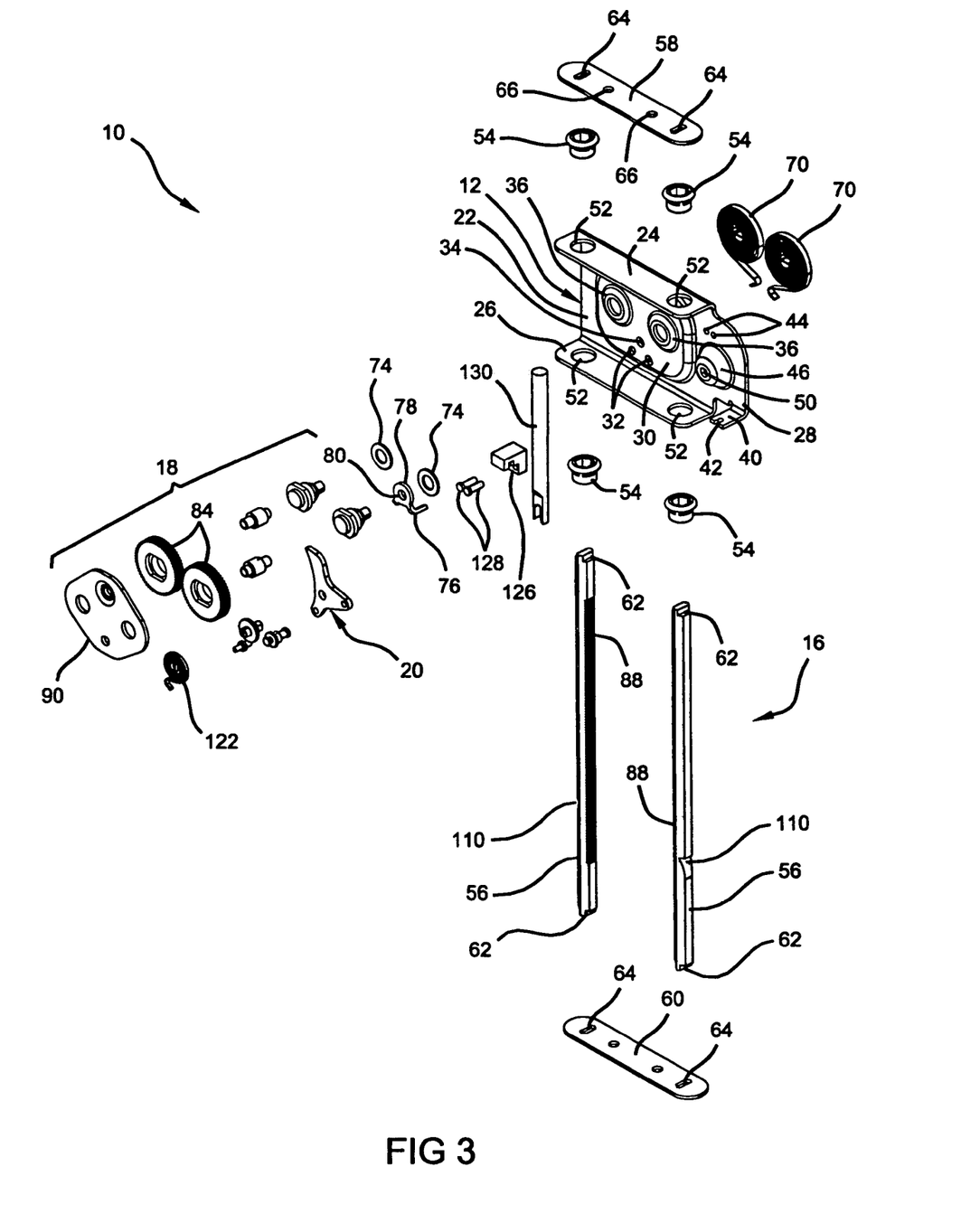
FIG. 3 is an exploded view of the headrest assembly of FIG. 1.

With particular reference to FIGS. 1–3, the housing 12 is shown to have a main body 22, first and second flanges 24, 26, and an extension 28. The main body 22 extends between the first and second flanges 24, 26 and contains an extrusion 30 extending outward from the surface of the main body 22 in the same direction as the first and second flanges 24, 26. The extrusion 30 includes two apertures 32 for receiving posts, two apertures 34 for receiving pegs (the second aperture of which cannot be seen in FIGS. 2 and 3, but is the aperture through which a second peg 100 extends as best seen in FIG. 1), and two apertures 36 for coupling components of automated actuator 18, all of which extend through extrusion 30. The periphery of apertures 36 extend beyond extrusion 30 in the same direction as the first and second flanges 24, 26 so that the periphery is not flush with extrusion 30. On the opposite side of main body 22 from extrusion 30, a well 38 results from extrusion 30.

First and second flanges 24, 26 extend generally perpendicular to the plane of main body 22 and include rail apertures 52 positioned to adjustably mount rail assembly 16 to housing 12. Camming knobs 54 are disposed in each of the four rail apertures 52. Extension 28 extends laterally from main body 22 beyond the lengths of first and second flanges 24, 26, and includes a receiving tab 40, which subsequently includes a receiving cutout 42. Extension 28 includes a pair of apertures 44 and a boss 46. On the opposite side of extension 28 from boss 46, a well 48 results from extruding boss 46. An aperture 50 for receiving lock member 20 extends through boss 46 to the side of well 48.

The rail assembly 16 includes rails 56, top end plate 58, and bottom end plate 60. The rails 56 include rail ends 62 keyed to fit in keyed apertures 64 of top end plate 58 and bottom end plate 60. Both the top end plate 58 and bottom end plate 60 also include seat apertures 66 for attaching the headrest assembly 10 to a seat assembly. The top end plate 58 attaches to head support 14 (shown in FIGS. 5–7) through seat apertures 66 and bottom end plate 60 is mounted to a seatback 68 (also shown in FIGS. 5–7).

Figure 4:
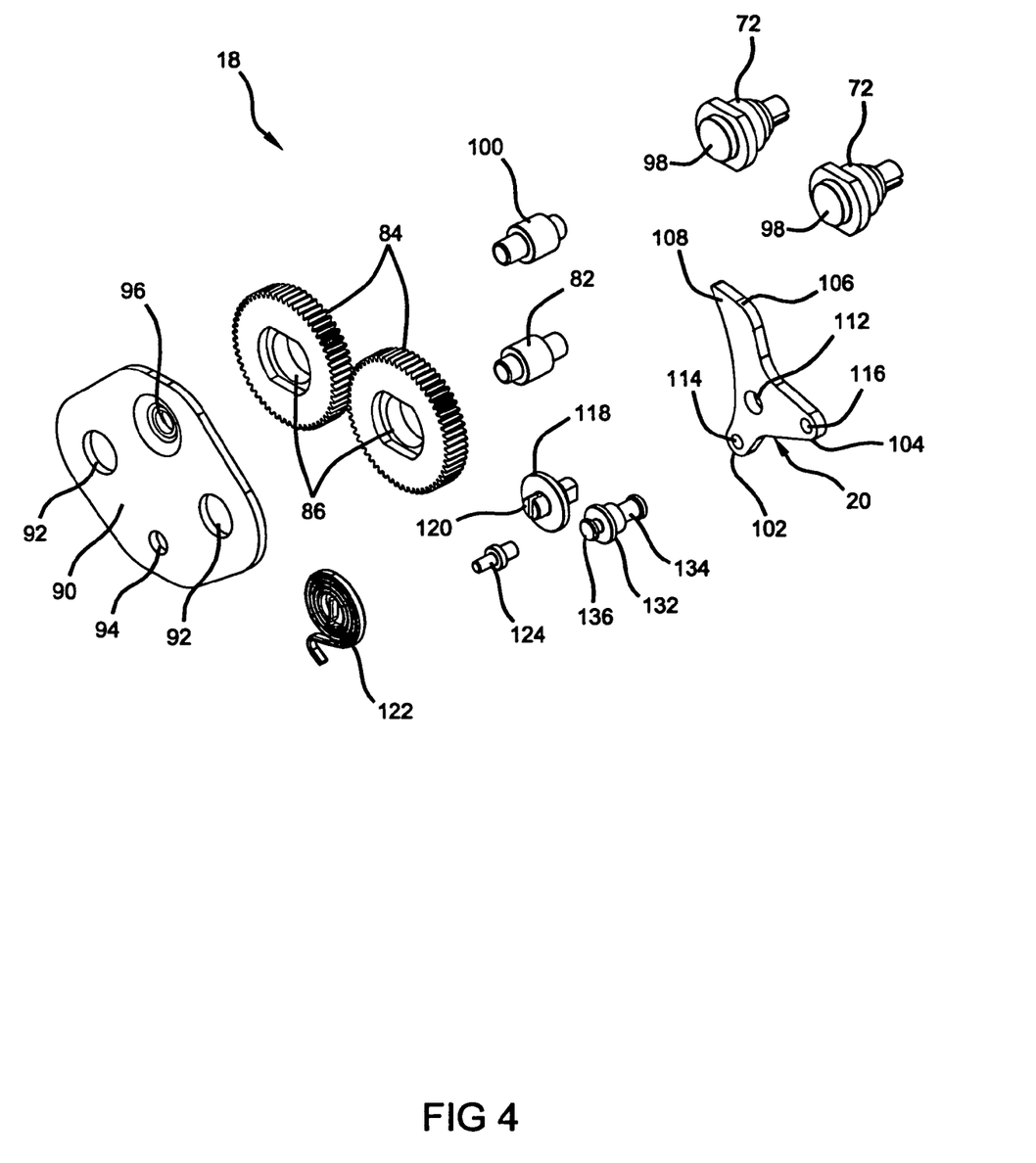
FIG. 4 is a more detailed exploded view of an automated actuator of FIG. 3.

With reference to FIGS. 3–4, the automated actuator 18 includes a pair of springs 70 located adjacent the well 38 of main body 22 and is supported by bolts 72 that are both received through apertures 36 of extrusion 30 and extend through the centers of the coils of springs 70. A pair of washers 74 are positioned between bolts 72 and apertures 36. Outer ends of springs 70 are secured by a pair of posts 76 (both of which are visible in FIG. 1), which are part of a clip 78 whose clip face 80 is laterally aligned with and secured to extrusion 30. The clip face 80 is secured to extrusion 30 by a first peg 82 that is received by aperture 34 adjacent apertures 32.

The springs 70 are coupled to respective gears 84 via bolts 72. More specifically, gears 84 have apertures 86 that spring bolts 72 pass through before entering apertures 36 to support springs 70, thus operably coupling the gears 84 with the springs 70. Gears 84 engage rail assembly 16 via teeth 88 disposed along rails 56. Additionally, a cover plate 90 includes two larger apertures 92 for receiving the bolts 72 that couple springs 70 to gears 84, a smaller aperture 94 for receiving the first peg 82, a recessed aperture 96 for receiving a second peg 100, and is attached to main body 22. More specifically, faces 98 of bolts 72 are received by larger apertures 92, first peg 82 is received by both smaller aperture 94 and the aperture 34 adjacent apertures 32, and second peg 100 is received by both recessed aperture 96 and the aperture 34 adjacent first flange 24 (not visible in FIGS. 3 or 4, but can be seen on FIG. 1 as the aperture receiving second peg 100).

The lock member 20 generally includes three lobes; two shorter lobes 102, 104, and a longer lobe 106. Longer lobe 106 includes a tapered end 108 operable to engage a notch 110 on one of the rails 56. Shorter lobes 102, 104 and longer lobe 106 are approximately equidistantly spaced around a center aperture 112 extending through lock member 20. Each shorter lobe 102, 104 includes an aperture extending through lock member 20: the shorter lobe 102 includes an aperture 114 for receiving a post and the shorter lobe 104 an aperture 116 for receiving a manual actuator 130. The longer lobe 106 of lock member 20 is guided by guide 126, which is attached to extension 28 by two guide pins 128 extending through apertures in guide 126 as well as through apertures 44 of extension 28. A post 118 couples lock member 20 to boss 46 by extending through center aperture 112 and the aperture 50 located through boss 46. An end 120 of spring post 118 remains adjacent the boss 46 of extension 28 in order to support a spring 122 whose end is anchored by post 124, which is fixed to lock member 20 through aperture 114.

Notch 110 is located on rail 56 to allow the rail assembly 16 to be moved to a first use position remote from the stow position. Intermediate use positions may also be provided between the first use position and the stow position by providing additional notches 110 or any other manner known in the art. In the use position, the tapered end 108 of longer lobe 106 engages rail 56 at notch 110 under the bias of spring 122. As lock member 20 is rotated against the bias of spring 122, i.e., in the clockwise direction relative to the view shown in FIG. 5, tapered end 108 disengages from notch 110 of rail 56, which causes gears 84 to move under the bias of springs 70. The movement of gears 84 is bias such that when they move, rail assembly 16 moves to return the headrest assembly 10 to a stow position. More specifically, gears 84 engage teeth 88 of rails 56 to move the rail assembly 16 toward seatback 68. Once the tapered end 108 is initially disengaged from notch 110 of rail 56 and the gears 84 begin to rotate, the tapered end 108 may return to its bias position and slide along rail 56 without impeding the movement of rail assembly 16.

Figure 5:
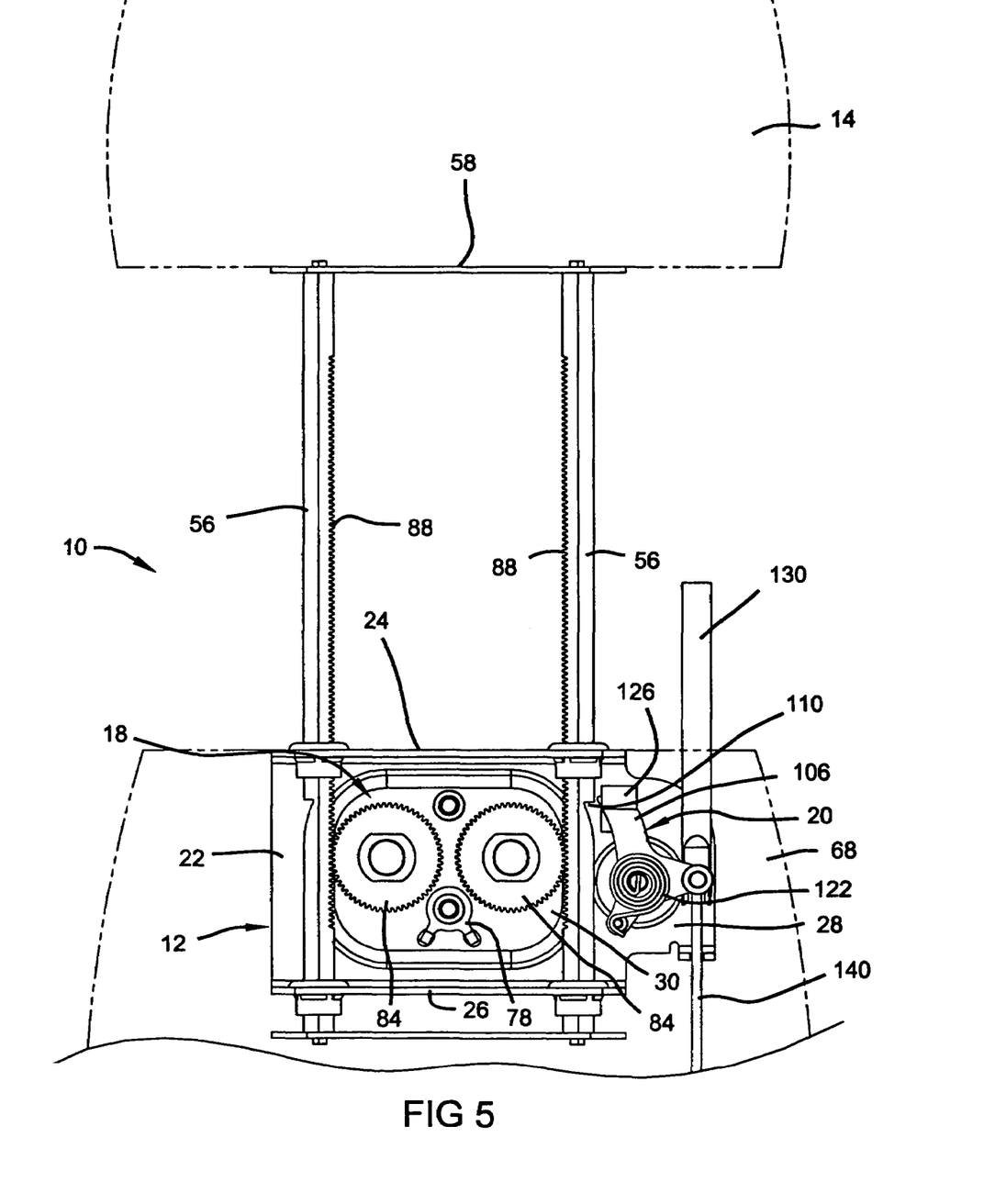
FIG. 5 is a rear view of the headrest assembly of FIG. 1, with the back plate removed to illustrate the headrest assembly with a lock member in a disengaged position.

With particular references to FIGS. 3–5, one way lock member 20 can be rotated against the bias of spring 122 as described above is through the use of manual actuator 130, which is connected to shorter lobe 104 through aperture 116. A pin 132 is connected to lock member 20 through aperture 116 and receives manual actuator 130 by joining manual actuator 130 to pin end 134. When the headrest assembly 10 is in the use position, the tapered end 108 of longer lobe 106 engages notch 110 of rail 56 under the bias of spring 122. By moving manual actuator 130 in the direction of arrow A in FIG. 5, lock member 20 is rotated against the bias of spring 122, i.e., in the clockwise direction relative to the view shown in FIG. 5. In turn, tapered end 108 disengages rail 56 at notch 110 and gears 84 subsequently move under the bias of springs 70. The movement of gears 84 causes the headrest assembly 10 to return to the stow position. Once the tapered end 108 is initially disengaged from notch 110 of rail 56 and the gears 84 begin to rotate, the manual actuator 130 may return to its initial position and the tapered end 108 will subsequently slide along rail 56 without impeding movement of rail assembly 16 to the stow position.

Lock member 20 may also be actuated by a recliner mechanism 138 operable to adjust a seatback 68 relative a seat bottom 144. The recliner mechanism 138 interacts with the headrest assembly 10 through a cable 140 coupled to lock member 20 through pin 132, which includes a pin head 136 opposite to pin end 134. More particularly, one end of cable 140 is received through cutout 42 in receiving tab 40 and connected to lock member 20 via pin head 136, while the opposite end of cable 140 is connected to the recliner mechanism 138. As recliner mechanism 138 is actuated to adjust seatback 68, cable 140 is manipulated. In this regard, the force associated with reclining seatback 68 is transmitted to the headrest assembly 10 such that the lock member 20 engages and disengages rail 56. At the point that recliner mechanism 138 causes cable 140 to become taut, cable 140 pulls in the direction of Arrow A in FIG. 5, causing lock member 20 to rotate against the bias of spring 122, i.e., in the clockwise direction relative to the view shown in FIG. 5, and initiating displacement of headrest assembly 10 from its use position. Specifically, the tapered end 108 of longer lobe 106 disengages from rail 56 at notch 110 and allows gears 84 to move under the bias force of springs 70, causing the headrest assembly 10 to return to the stow position as described above. Once the tapered end 108 is initially disengaged from the rail 56 at notch 110 and the gears 84 begin to rotate, the tapered end 108 may engage rail 56 away from notch 110 and subsequently slide along rail 56 without impeding the movement of rail assembly 16.

With particular reference to FIGS. 3, 5–7, head support 14 attaches to top end plate 58 through seat apertures 66. Housing 12 is attached to a top portion of seatback 68 such that first flange 24 of housing 12 is located near the top of seatback 68. Subsequently, the majority of housing 12 is situated within seatback 68. As the headrest assembly 10 is moved from its stow position to its use position by moving head support 14 away from seatback 68, rails 56 extend from seatback 68. The seat operator may manually move head support 14 to a desired use position relative to seatback 68, such as the first use position wherein tapered end 108 of longer lobe 106 engages rail 56 at notch 110.

Figure 6:
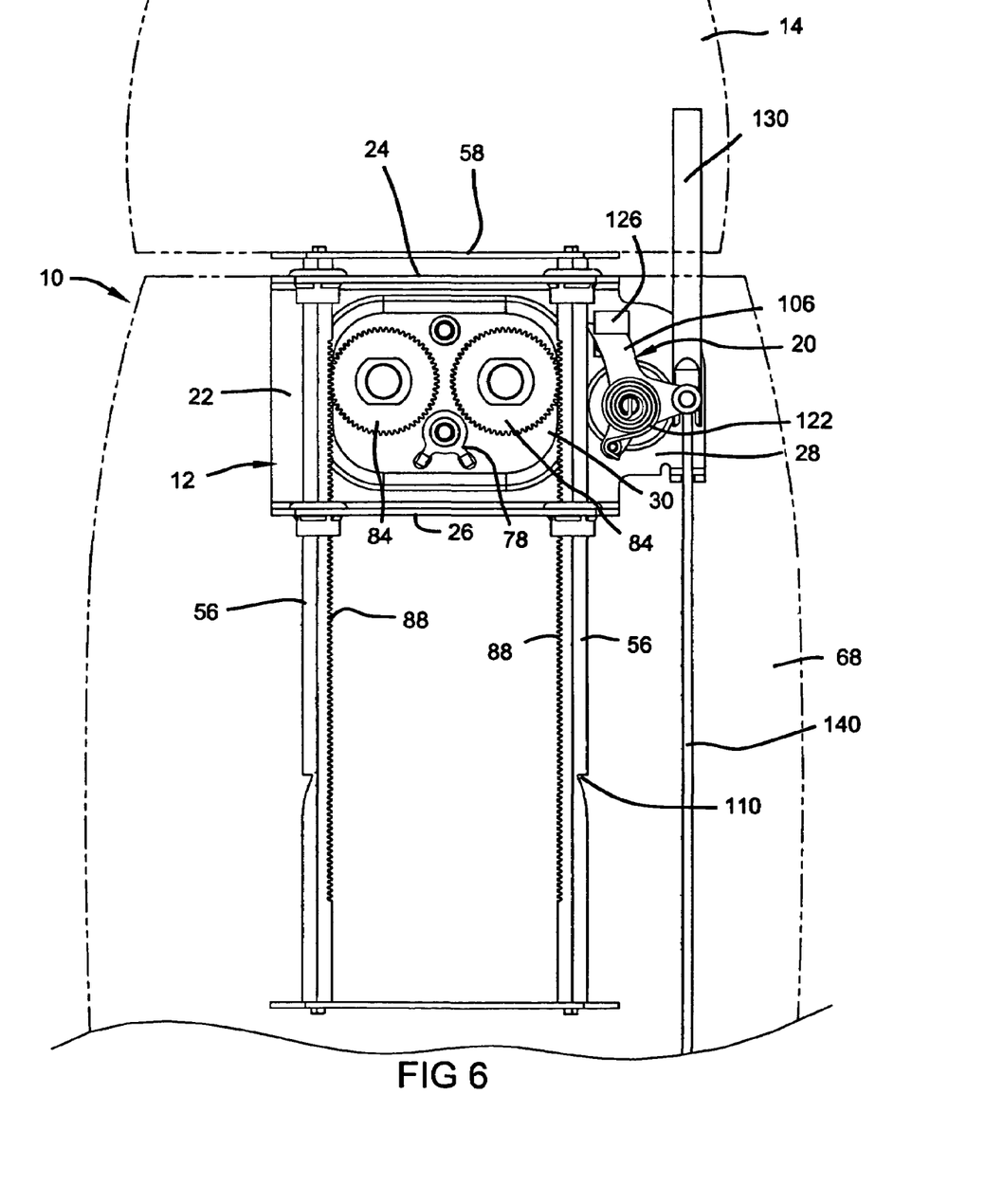
FIG. 6 is a rear view of the headrest assembly of FIG. 5, with the back plate removed to illustrate the headrest assembly in a stow position.
Figure 7:
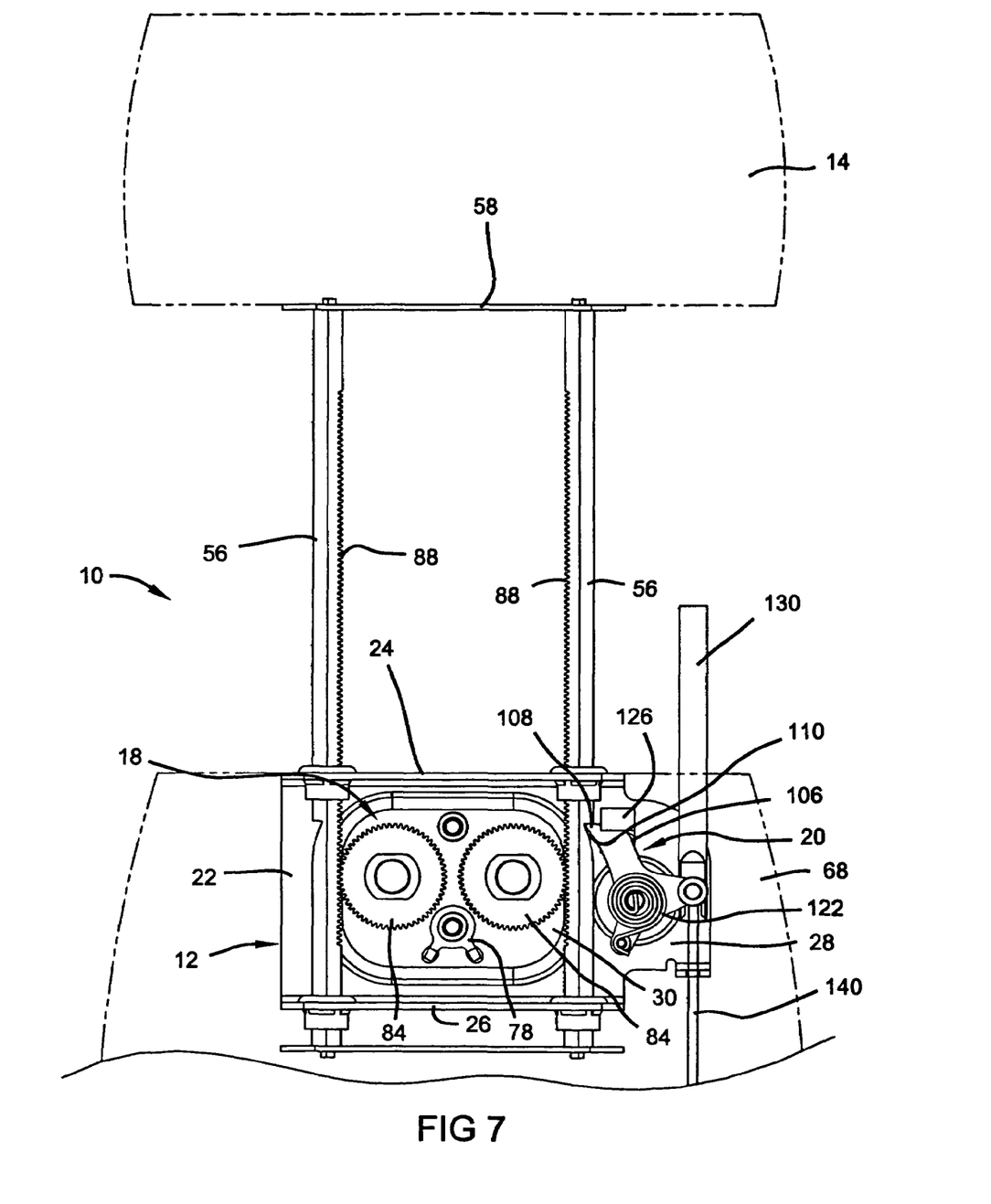
FIG. 7 is a rear view of the headrest assembly of FIGS. 5 and 6, with a back plate removed to illustrate the headrest assembly in a use position.

In order to move headrest assembly 10 from a use position to a stow position, a force in the direction of arrow A in FIG. 5 is applied either via the manual actuator 130 or the cable 140 as described above. Either method causes the lock member 20 to rotate against the bias of spring 122, i.e., in the clockwise direction relative to the view shown in FIG. 5. This rotation of lock member 20 causes tapered end 108 of longer lobe 106 to disengage from rail 56 at notch 110. Upon disengagement, rails 56 slide in the direction of arrow A toward the stow position under the force of springs 70 acting on gears 84. Specifically, gears 84 and springs 70 are coupled and bias so that headrest assembly 10 automatically returns to the stow position upon the disengagement of tapered end 108 from rail 56 at notch 110. FIG. 5 shows the headrest assembly 10 when lock member 20 is disengaged from rail 56 to allow headrest assembly 10 to move from its use position to its stow position. FIG. 6 shows headrest assembly 10 in a stow position, wherein gears 84 are coupled with rails 56 at the top-most point of rails 56. FIG. 7 shows headrest assembly 10 in a use position, wherein tapered end 108 of lock member 20 is engaged with notch 110 of rail 56.

Figure 8:
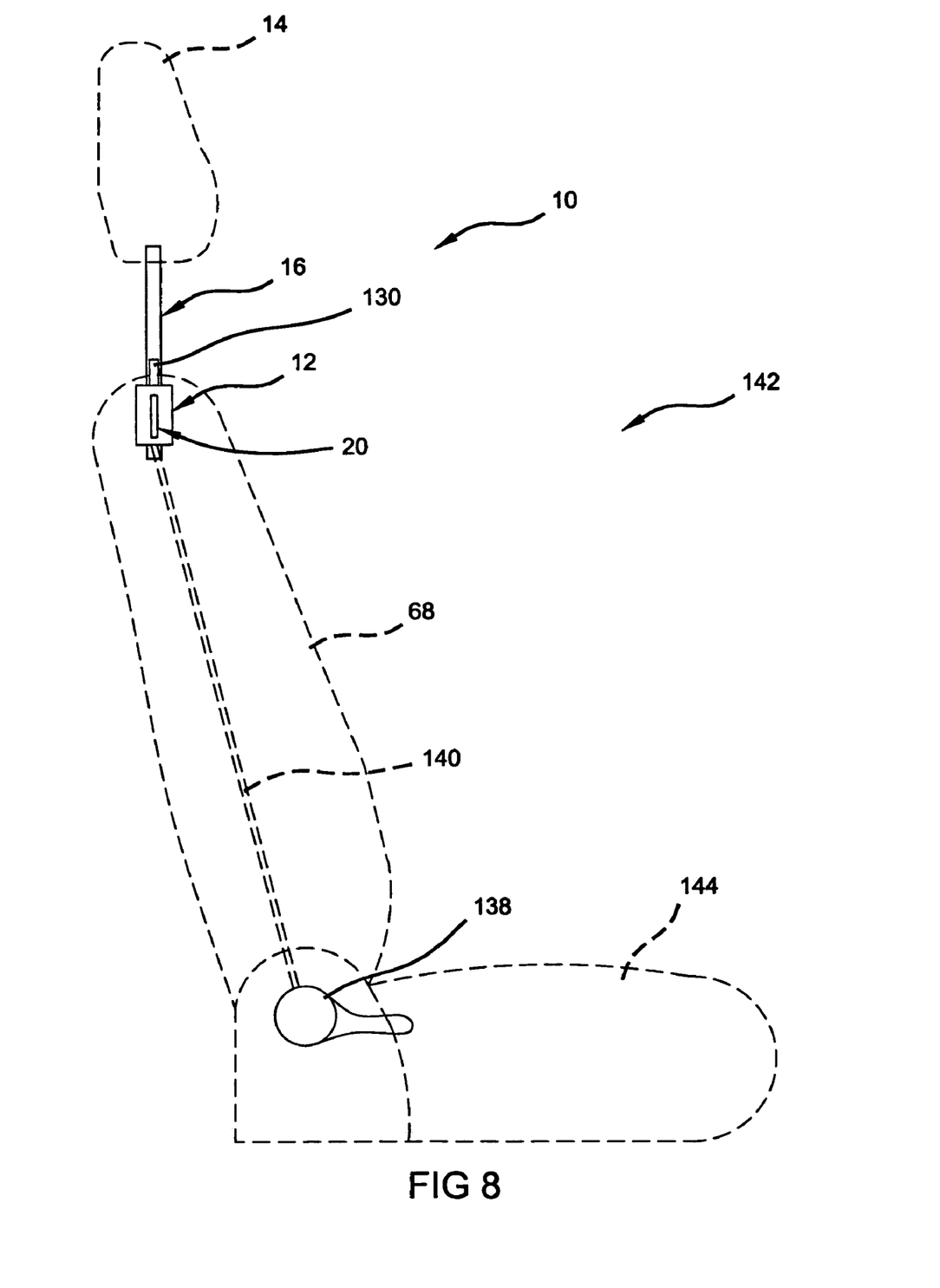
FIG. 8 is a side view of a seat assembly incorporating the headrest assembly of FIG. 1 and with both assemblies in a use position.
Figure 9:
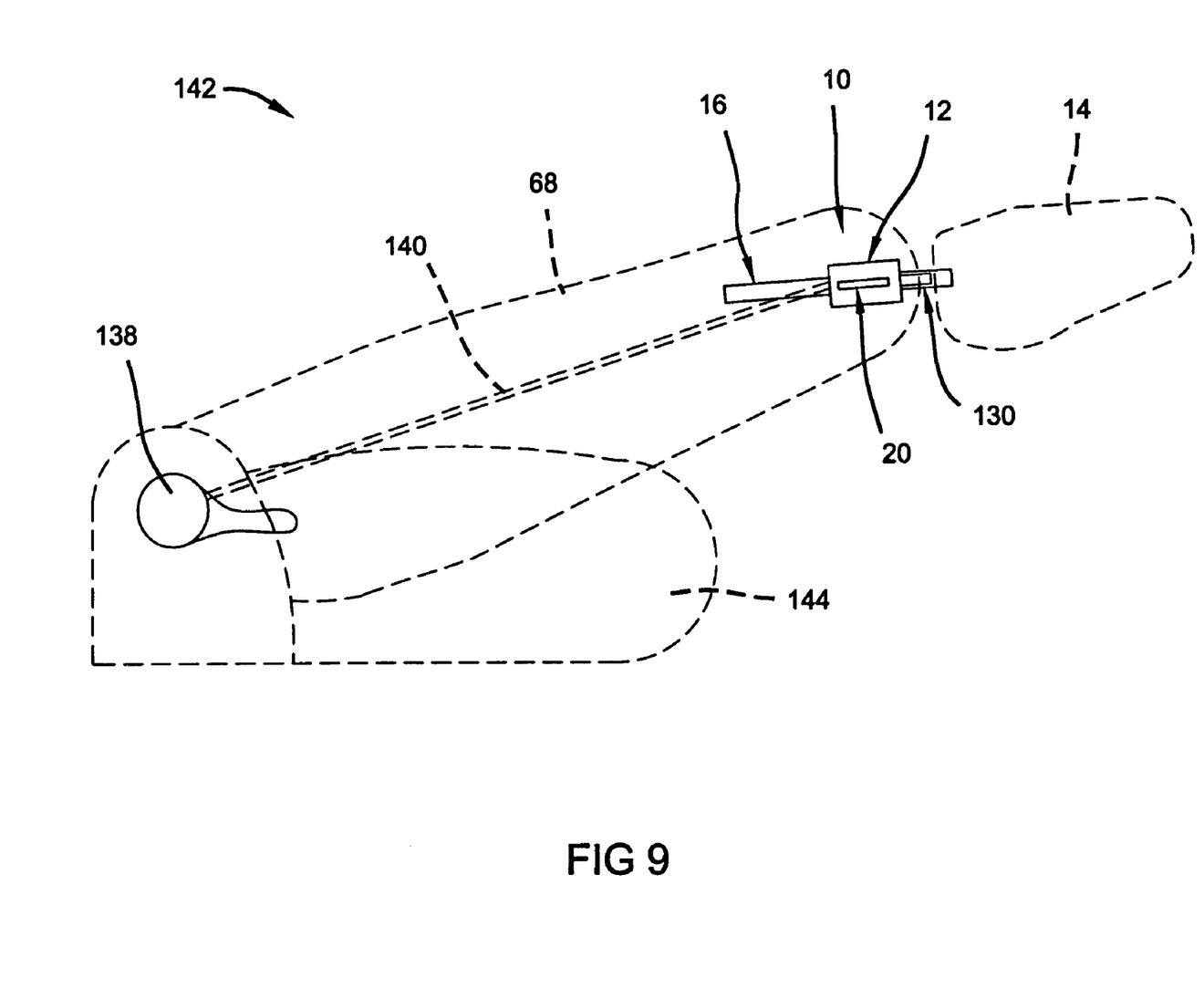
FIG. 9 is a side view of the seat assembly of FIG. 8 with both assemblies in a stow position.

With particular reference to FIGS. 8 and 9, the headrest assembly 10 is shown incorporated into a seat assembly 142, including a seat bottom 144, seatback 68, and recliner mechanism 138. Seatback 68 is rotatably supported by seat bottom 144 and includes recliner mechanism 138 disposed therebetween. Recliner mechanism 138 is operable to selectively permit and restrict rotation of seatback 68 relative to seat bottom 144.

The lock member 20 is in mechanical communication with recliner mechanism 138 via cable 140. The first end of cable 140 is fixably attached to recliner mechanism 138. The second end of cable 140 is attached to pin head 136, which resultantly causes cable 140 to be fixably attached to lock member 20 via pin head 136. Thus, cable 140 is operable to apply a force on lock member 20 via pin head 136 to disengage the tapered end 108 (best shown in FIG. 4) of lock member 20 from rail 56 (best shown in FIGS. 2, 3) of rail assembly 16. The resultant force causes lock member 20 to rotate in the clockwise direction relative to the view shown in FIG. 5.

When seatback 68 is in a fully forward or upright position, headrest assembly 10 is similarly in a fully upright position such that the tapered end 108 of lock member 20 is engaged with notch 110 of rail 56, as best shown in FIGS. 7, 8. To recline seatback 68 relative to seat bottom 144, a force is applied to recliner mechanism 138 such that the recliner mechanism 138 disengages seatback 68. Once the recliner mechanism 138 has sufficiently disengaged seatback 68, a force may be applied to seatback 68 to thereby flip-downward seatback 68 relative to seat bottom 144. The force applied to flip-downward seatback 68 relative to seat bottom 144 causes a tensile force to be concurrently applied to cable 140. This tensile force is generated due to the relationship between cable 140, recliner mechanism 138, and the manual actuator pin head 136 that transmits the force to lock member 20.

The tensile force of cable 140 causes a force in the direction of arrow A in FIG. 5 to rotate lock member 20 against the bias of spring 122, i.e., the clockwise direction relative to the view shown in FIG. 5, leading the tapered end 108 of lock member 20 to disengage from rail 56 at notch 110. Upon disengagement, rails 56 slide in the direction of arrow A toward the stow position under the force of springs 70 acting on gears 84. Specifically, gears 84 and springs 70 are coupled and bias so that headrest assembly 10 automatically returns to the stow position upon the disengagement of tapered end 108 from notch 110 of rail 56.

Once seatback 68 has been moved to the stow position and recliner mechanism 138 locks seatback 68 relative to seat bottom 144, cable 140 loses its tensile force and spring 122 once again biases lock member 20 in the counterclockwise direction relative to the view shown in FIG. 5 until lock member 20 engages rail 56 away from notch 110. The headrest assembly 10 and the seat assembly 142, each in their respective stow positions, is best seen in FIGS. 6, 9. In order to return seat assembly 142 from the stow position to the use position, a force is applied to recliner mechanism 138 to disengage seatback 68 from seat bottom 144, thereby allowing seatback 68 to rotate relative to seat bottom 144. While the force applied to recliner mechanism 138 may cause a tensile force to be concurrently applied to cable 140 and the resultant force may disengage the lock member 20 from the rail assembly 16, the rail assembly 16 cannot axially move any further because springs 70 have already biased gears 84 to the stow position for the headrest assembly 10. Once seatback 68 has returned to the use position and seatback 68 is again locked relative to seat bottom 144, cable 140 loses its tensile force and headrest assembly 10 remains in the stow position. The seat operator may manually move head support 14 to a desired use position relative to the seatback 68.

Headrest assembly 10 may be returned to a stow position when both the headrest assembly 10 and the seat assembly 142 are in a use position by manipulation of manual actuator 130, which rotates lock member 20 in a manner similar to cable 140. By moving the manual actuator 130 downward in the direction of arrow A in FIG. 5, a force is transmitted that causes lock member 20 to rotate against the bias of spring 122, i.e., in the clockwise direction relative to the view shown in FIG. 5. Subsequently, the tapered end 108 of lock member 20 disengages from rail 56 at notch 110 and rails 56 slide in the direction of arrow A toward the stow position under the force of springs 70 acting on gears 84. Specifically, gears 84 and springs 70 are coupled and bias so that headrest assembly 10 automatically returns to the stow position upon the disengagement of tapered end 108 from notch 110 of rail 56. Seat assembly 142 may subsequently be moved to its stow position by using the recliner mechanism 138, as discussed above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A headrest assembly comprising:
   a head support;
   a housing and a rail operably coupled to adjustably support said head support; and
   a biasing member coupled to a gear in communication with said rail and rotatably coupled to said housing such that rotation of said gear creates a relative motion between said rail and said housing, said biasing member biasing said relative motion between said rail and said housing toward a stow position of said head support.

2. The headrest assembly of claim 1 wherein said biasing member is a spring forcing said gear to rotate along said rail.

3. The headrest assembly of claim 2 wherein said rail includes a plurality of teeth operable to mesh with said gear.

4. The headrest assembly of claim 1 wherein said rail is two rails.

5. The headrest assembly of claim 4 wherein said biasing member further comprises a first spring and a second spring, said first spring coupled to a first gear and said second spring coupled to a second gear, said first spring and said second spring respectively causing said first gear and said second gear to rotate along said rails.

6. The headrest assembly of claim 1 further comprising a lock member operable to oppose said relative motion between said rail and said housing toward said stow position thereby maintaining said head support in said use position.

7. The headrest assembly of claim 6 wherein said lock member is coupled to said housing.

8. The headrest assembly of claim 6 wherein said rail includes a notch for receiving said lock member when said head support is in a use position.

9. The headrest assembly of claim 6 wherein said lock member includes a spring to bias said lock member toward said rail.

10. The headrest assembly of claim 9 further comprising a cable attached to said lock member, wherein said cable opposes bias from said spring when taut.

11. The headrest assembly of claim 6 further comprising an actuator connected to said lock member, said actuator operable to initiate said relative motion between said rail and said housing, thereby translating said head support from said use position to said stow position.

12. The headrest assembly of claim 6 further comprising a manual actuator connected to said lock member, said manual actuator operable to initiate said relative motion between said rail and said housing, thereby translating said head support from said use position to said stow position.

13. The headrest assembly of claim 1 further comprising an automated actuator operable to initiate said relative motion between said rail and said housing thereby translating said head support from said use position to said stow position.

14. The seat assembly of claim 13 wherein said biasing element is a spring forcing said gear to rotate along said rail.

15. A seat assembly comprising:
    a seat bottom;
    a seatback rotatably supported by said seat bottom;
    and a headrest assembly supported by said seatback, said headrest assembly including:
       a head support;
       a housing and a rail operably coupled to adjustably support said head support; and
       a biasing member coupled to a gear in communication with said rail and rotatably coupled to said housing such that rotation of said gear creates a relative motion between said rail and said housing, said biasing member biasing said relative motion between said rail and said housing toward a stow position of said head support.

16. The seat assembly of claim 15 wherein said rail is two rails.

17. The seat assembly of claim 16 wherein said biasing element further comprises a first spring and a second spring, said first spring coupled to a first gear and said second spring coupled to a second gear, said first spring and said second spring respectively causing said first gear and said second gear to rotate along said rails.

18. The headrest assembly of claim 15 further comprising a lock member operable to oppose said relative motion between said rail and said housing toward said stow position thereby maintaining said head support in said use position.

19. The seat assembly of claim 18 wherein said lock member includes a spring to bias said lock member toward said rail.

20. The seat assembly of claim 19 further comprising a recliner mechanism connected to said lock member via a cable and providing a pivotable connection between said seatback and said seat bottom, wherein said cable opposes said spring when said seatback is rotated toward said seat bottom.

21. The seat assembly of claim 18 further comprising a manual actuator connected to said lock member, said manual actuator operable to initiate said relative motion between said rail and said housing, thereby translating said head support from said use position to said stow position.

* * * * *